Dec. 12, 1950 W. L. L. VIVIE 2,533,979
CUTTING PLATE OF DRY-SHAVING APPARATUS
Filed July 3, 1946
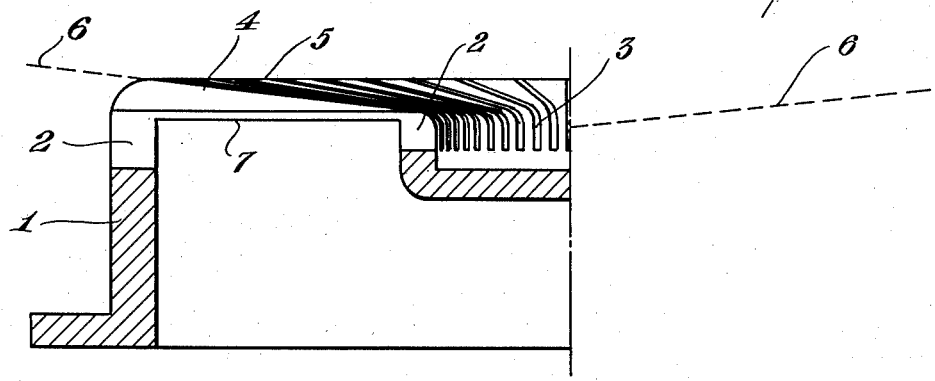
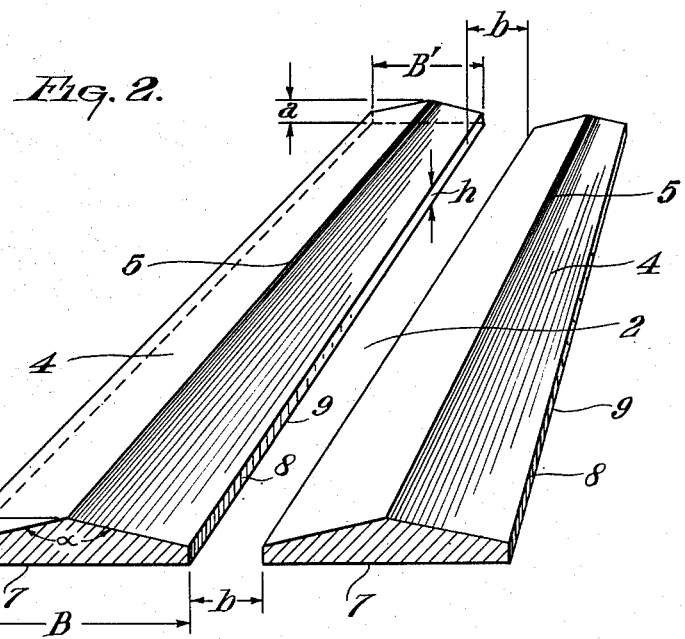
INVENTOR.
WILHELMUS LAMBERTUS LEONARDUS VIVIE
BY
Wenderoth, Lind & Ponack
ATTORNEYS Patented Dec. 12, 1950

2,533,979

UNITED STATES PATENT OFFICE 2,533,979

CUTTING PLATE OF DRY-SHAVING APPARATUS

Wilhelmus L. Leonardus Vivie, Eindhoven, Netherlands, assignor to Hartford National Bank and Trust Company, Hartford, Conn., as trustee Application July 3, 1946, Serial No. 681,344
In the Netherlands July 23, 1943

Section 1, Public Law 690, August 8, 1946
Patent expires July 23, 1963

3 Claims. (Cl. 30—43)

Cutting plates for dry-shaving apparatus have been proposed and have become known already in a very large number of different constructions. For example, with known cutting plates having slits which extend, for example more or less tangentially, preferably, however, radially or substantially radially, from the outer circumference to the central portion, it has already been proposed to give the cutting plate a thickness which decreases, preferably gradually, from the outer edge towards the central portion in such manner that the outside of the cutting plate, which is to be applied to the skin, has the shape of an inverted cone whereas at the place of the running surface of the cutting member the inside is flat.

The advantage of such a construction resides in the comparatively great strength of the cutting plate so that damage to the ribs present between the slits, either during the manufacture or during the daily use of the apparatus in shaving, remains restricted as far as possible to a minimum. The dimensions of the thickness are generally so chosen that the thickest portion of the ribs is slightly thicker and the thinnest portion is slightly thinner than the normally usual thickness of these ribs. Further data on this subject are given in the description of the drawing. In spite of the greater strength, more particularly against bending under the pressure experienced by the ribs on the skin, a quite satisfactory cutting action is obtained since at the place of the great thickness of the cutting plate "pre-shaving" takes place and at the place of the small thickness "re-shaving" occurs, the skin being shaved more or less thoroughly. The invention has for its object a further improvement of such a cutting plate, more particularly as regards the cutting action, without prejudice to the mechanical strength.

According to the invention, a cutting plate of a dry-shaving apparatus is characterized by the combination of the following, partly known, features:

a. The cutting plate exhibits slits which extend, preferably radially or substantially radially, from the outer circumference to the central portion.

b. The cutting plate has a thickness which decreases, preferably gradually, from the outer edge to the central portion, in such manner that that side of the cutting plate which is to be applied to the skin, has the shape of a cup whereas the underside is flat.

c. The ribs present between the slits have a cross-section which has the shape of an inverted V with an obtuse angle, preferably of approximately 120°, at the top.

d. On the sides of their length the slits are bounded by lateral faces of the ribs, which faces are perpendicular or substantially perpendicular to the flat running surface of the cutting member on the underside of the cutting plate.

As previously has been mentioned when setting out the object in view, such a cutting plate possesses quite satisfactory cutting properties and has a great mechanical strength.

The improvement in the cutting properties is obtained owing to the fact that, especially in the neighbourhood of the central portion of the cutting plate, there is produced a great useful shaving effect due to the combination of a width of the ribs which is comparatively small with respect to the width of the slits—owing to which there exists a great ratio of the open surface area to the closed surface area of the cutting plate—a small average thickness of the ribs and a very small thickness of that portion of the ribs which adjoins the slits.

A further, very particular advantage is that such a cutting plate can be manufactured in a very simple manner.

The invention will be explained more fully with reference to the accompanying drawing, which represents diagrammatically, by way of example, one embodiment thereof.

Fig. 1 represents one half of the cross-section of a circular cutting plate whose axis of symmetry is indicated by a dot-and-dash line.

Fig. 2 represents a few ribs of the cutting plate shown in Fig. 1.

The cutting plate 1 represented in Fig. 1 exhibits radial slits 2 which open into a central depression 3. At the circumference the ribs 4 are thicker than in the neighbourhood of the central depression. Fig. 2 represents two of these ribs to an enlarged scale. In one suitably chosen example of construction the greatest thickness D amounts to 0.13 mm. and the smallest thickness d to 0.08 mm. in both cases measured from the ridge-line 5. As may be seen from Fig. 1, the outside of the cutting plate, which outside is to be applied to the skin and substantially consists of the ridge-lines 5, has the shape of a cup or a cone, as is indicated for clearness by dotted lines 6, whereas at the place of the running surface for the cutting member (not shown) the inside 7 is flat.

Furthermore, the ribs present between the slits have a cross-section in the shape of an inverted V with an obtuse angle at the top, which angle amounts in the present case to approximately 120°, owing to which a sufficient mechanical strength is ensured and notwithstanding in the neighbourhood of the slits 2 a very small thickness may be utilized, which is beneficial to the quality of shaving.

The height denoted in Fig. 2 by $h$ is only 0.05 mm. so that the hairs can be cut off closely when compared with the normal thickness of a flat cutting plate, which is approximately 0.06 to 0.1 mm., for example 0.08 mm.

Finally, the slits 2 are bounded by lateral faces 8 of the ribs 4, which faces are perpendicular or substantially perpendicular to the flat running surface 7 for the cutting member on the underside of the cutting plate, which greatly conduces to obtain a satisfactory cutting action between the cutting edges of the cutting member and the cutting edges 9 located in the faces 8.

In the drawing are utilized furthermore slits of a constant width $b$, although the invention is not limited to this construction and, if desired, slits of variable width may be utilized as well.

What I claim is:

1. A cutting plate member for dry shaving apparatus, comprising a plurality of rib portions substantially radially arranged about a central axis and interconnected at their peripheral and central portions, each of said rib portions having an inner flat cutting surface, having lateral face surfaces extending from the said cutting surface substantially perpendicular to the cutting surface, and having outer surfaces extending from said lateral surfaces to form an obtuse angle, said rib portions having a thickness as measured from the apex of the said obtuse angle to the cutting surface greater at the said peripheral portion of the rib portion than at the said central portion thereof.

2. A cutting plate member for dry shaving apparatus, comprising a plurality of rib portions substantially radially arranged about a central axis and interconnected at their peripheral and central portions, each of said rib portions having an inner flat cutting surface, having lateral face surfaces extending from the said cutting surface substantially perpendicular to the cutting surface, and having outer surfaces extending from said lateral surfaces to form an obtuse angle, the cutting surfaces of said rib portions lying in a plane perpendicular to said central axis, and said rib portions having a thickness as measured from the apex of the said obtuse angle to the cutting surface greater at the said peripheral portion of the rib portion than at the said central portion thereof.

3. A cutting plate member for dry shaving apparatus, comprising a plurality of rib portions substantially radially arranged about a central axis and interconnected at their peripheral and central portions to form an annular plate member having a central recessed portion, each of said rib portions having an inner flat cutting surface, having lateral face surfaces extending from the said cutting surface substantially perpendicular to the cutting surface, and having outer surfaces extending from said lateral surfaces to form an angle of approximately 120°, the cutting surfaces of said rib portions lying in a plane perpendicular to said central axis and, said rib portions having a thickness as measured from the apex of the said obtuse angle to the cutting surface greater at the peripheral portion of the rib portion than at the central portion thereof.

WILHELMUS LAMB. LEONARDUS VIVIE.

REFERENCES CITED

The following references are of record in the file of this patent:

UNITED STATES PATENTS

| Number | Name | Date |
|---|---|---|
| 1,633,063 | Bernarducci | June 21, 1927 |
| 2,105,223 | Nicholl | Jan. 11, 1938 |
| 2,144,525 | Dalkowitz | Jan. 17, 1939 |
| 2,223,768 | Martin | Dec. 3, 1940 |
| 2,244,321 | Winder | June 3, 1941 |
| 2,331,274 | Martin | Oct. 5, 1943 |

FOREIGN PATENTS

| Number | Country | Date |
|---|---|---|
| 521,709 | Great Britain | May 29, 1940 |
| 856,092 | France | Mar. 4, 1940 |